US012616085B2

(12) United States Patent (10) Patent No.: US 12,616,085 B2
Howard (45) Date of Patent: May 5, 2026

(54) BRUSH ATTACHMENT SYSTEM FOR A TURFGRASS MOWER

(71) Applicant: Harold F. Howard, Phoenix, AZ (US)

(72) Inventor: Harold F. Howard, Phoenix, AZ (US)

( * ) Notice: Subject to any disclaimer, the term of this patent is extended or adjusted under 35 U.S.C. 154(b) by 643 days.

(21) Appl. No.: 18/063,995

(22) Filed: Dec. 9, 2022

(65) Prior Publication Data

US 2024/0049625 A1 Feb. 15, 2024

Related U.S. Application Data

(60) Provisional application No. 63/396,513, filed on Aug. 9, 2022.

(51) Int. Cl.
| | |
|---|---|
| *A01B 45/00* | (2006.01) |
| *A01D 34/00* | (2006.01) |
| *A01D 57/00* | (2006.01) |
| *A01D 101/00* | (2006.01) |

(52) U.S. Cl.
CPC ............ *A01D 34/001* (2013.01); *A01B 45/00* (2013.01); *A01D 57/00* (2013.01); *A01D 2101/00* (2013.01)

(58) Field of Classification Search
CPC ......... Y10S 56/12; A01D 43/00; A01D 43/02; A01D 75/00; A01D 42/06; A01D 34/00; A01D 34/015; A01D 34/42; A01D 34/43; A01D 34/62; A01D 34/82; A01D 34/001; A01D 57/00; A01D 57/01; A01D 2101/00; A01D 45/00; A01B 45/00
See application file for complete search history.

(56) References Cited

U.S. PATENT DOCUMENTS

| | | | | |
|---|---|---|---|---|
| 1,757,844 A | * | 5/1930 | Pol | A01D 57/01 |
| | | | | 56/5 |
| 1,890,810 A | * | 12/1932 | Gast | A01D 43/16 |
| | | | | 56/DIG. 12 |
| 2,021,821 A | | 11/1935 | Wescott | |
| 2,143,402 A | * | 1/1939 | Baker | A01D 57/01 |
| | | | | 56/3 |
| 2,197,264 A | | 4/1940 | Cooper | |
| 2,962,854 A | * | 12/1960 | Jepson | A01D 34/63 |
| | | | | 56/11.1 |
| 2,984,961 A | * | 5/1961 | Judkins | A01D 42/06 |
| | | | | 15/348 |

(Continued)

FOREIGN PATENT DOCUMENTS

WO 0150837 A1 7/2001

*Primary Examiner* — Adam J Behrens
(74) *Attorney, Agent, or Firm* — Pacer K. Udall; Booth Udall, PLC

(57) ABSTRACT

A brush attachment system with a first module that has a mounting bracket, an arm support, an arm, and an elongated member. The mounting bracket is configured to mount onto a first side of the turfgrass mower. The arm support is coupled to the mounting bracket and the arm has a first end that is pivotally coupled to the arm support. The second end of the arm is configured to couple with a turfgrass brush. The arm is configured to rotate between an active position in which the arm extends towards the front of the turfgrass mower and an inactive position in which the arm is lifted away from the front of the turfgrass mower. The elongated member is configured to extend through the turfgrass mower to a second side of the turfgrass mower and exert a force on the brush attachment system toward the turfgrass mower.

23 Claims, 12 Drawing Sheets

(56) References Cited

U.S. PATENT DOCUMENTS

| | | | | | |
|---|---|---|---|---|---|
| 3,525,201 | A | | 8/1970 | Kaufman | |
| 4,899,828 | A | | 2/1990 | Harris | |
| 4,989,676 | A | * | 2/1991 | Rogers | A01D 42/06 |
| | | | | | 172/438 |
| 5,477,927 | A | | 12/1995 | Figura | |
| 6,732,500 | B1 | | 5/2004 | Myers | |
| 7,065,947 | B1 | * | 6/2006 | Street | E01H 1/02 |
| | | | | | 56/378 |
| 7,069,711 | B1 | * | 7/2006 | Connell | A01B 45/00 |
| | | | | | 56/16.7 |
| 8,104,252 | B1 | * | 1/2012 | Godley, Jr. | A01D 42/04 |
| | | | | | 56/2 |
| 8,220,240 | B2 | * | 7/2012 | Tielburger | A01D 43/02 |
| | | | | | 56/193 |
| 8,628,107 | B2 | | 1/2014 | Harper | |
| 9,730,381 | B2 | * | 8/2017 | Fichera | A01D 34/001 |
| 9,820,437 | B2 | * | 11/2017 | Hoppel | A01D 43/12 |
| 9,839,176 | B1 | * | 12/2017 | Snyder | A01B 35/24 |
| 10,368,483 | B1 | * | 8/2019 | Howard | A01D 34/001 |
| 10,375,886 | B2 | * | 8/2019 | Hine | A01D 34/54 |
| 11,252,862 | B1 | * | 2/2022 | Howard | A01D 57/01 |
| 11,472,242 | B1 | | 10/2022 | Draper | |
| 11,565,557 | B2 | | 1/2023 | McAllister | |
| 12,075,732 | B2 | * | 9/2024 | Danling | A01B 45/00 |
| 2003/0145570 | A1 | | 8/2003 | Berndt | |
| 2003/0230067 | A1 | * | 12/2003 | Weinlader | A01D 43/00 |
| | | | | | 56/320.1 |
| 2008/0122198 | A1 | | 5/2008 | Anderson | |
| 2010/0154374 | A1 | * | 6/2010 | Hibino | A01D 43/003 |
| | | | | | 56/1 |
| 2010/0326679 | A1 | * | 12/2010 | Tielburger | A01B 45/00 |
| | | | | | 172/29 |
| 2012/0096661 | A1 | | 4/2012 | Pizano | |
| 2013/0056956 | A1 | | 3/2013 | Mauerman | |
| 2014/0215989 | A1 | | 8/2014 | Pilon, Jr. | |
| 2015/0201554 | A1 | * | 7/2015 | McCarthy | A01D 43/00 |
| | | | | | 56/14.7 |
| 2015/0223396 | A1 | | 8/2015 | Lingle | |
| 2023/0284544 | A1 | * | 9/2023 | Behling | A01D 34/001 |

* cited by examiner

BRUSH ATTACHMENT SYSTEM FOR A TURFGRASS MOWER

CROSS REFERENCE TO RELATED APPLICATIONS

This application claims the benefit of the filing date of U.S. Provisional Patent Application 63/396,513 entitled "Brush Attachment System for a Turfgrass Mower" to Harold F. Howard that was filed on Aug. 9, 2022, the disclosure of which is hereby incorporated herein by this reference.

TECHNICAL FIELD

Aspects of this document relate generally to turfgrass mowers, and more specifically to brush attachments for turfgrass mowers.

BACKGROUND

In caring for turfgrass, it is desirable to have each blade of grass be as close to the same length as possible, as this increases the aesthetic appeal of the grass and allows the grass to apply a consistent effect to any objects traveling over the grass, such as a golf ball. To this end, turfgrass may be brushed prior to cutting so that each blade will be as close to the same length as possible.

SUMMARY

Aspects of this document relate to a brush attachment system for a turfgrass mower, comprising a left-side module and a right-side module configured to respectively couple with a left side and a right side of the turfgrass mower, each of the left-side module and the right-side module having a mounting bracket configured to mount onto the turfgrass mower, the mounting bracket having a mounting aperture surrounded by a recessed cavity sized and shaped to receive a portion of the turfgrass mower, an adaptor extending through the mounting aperture of the mounting bracket and having a lip sized and shaped to prevent the adaptor from passing completely through the mounting aperture, the adaptor configured to secure the mounting bracket in a mounted position where the portion of the turfgrass mower is within the cavity, an arm support coupled to the mounting bracket and rotationally fixed with respect to the mounting bracket, the arm support having a main body with an upper stop and a lower stop extending away from the main body, and an arm having a first end pivotally coupled to the arm support and a second end configured to couple with a turfgrass brush, wherein the upper stop and the lower stop are each positioned to limit rotation of the arm with respect to the arm support and wherein the arm is configured to rotate between an active position in which the arm is adjacent the lower stop and an inactive position in which the arm is adjacent the upper stop, and an elongated member configured to extend through the turfgrass mower, attach the adaptor of the left-side module to the adaptor of the right-side module, and exert a first force on the adaptor of the left-side module toward the turfgrass mower and a second force on the adaptor of the right-side module toward the turfgrass mower, wherein the mounting bracket is configured to be rotationally fixed in all directions with respect to the turfgrass mower when the mounting bracket is mounted onto the turfgrass mower, and wherein when the brush attachment system is mounted on the turfgrass mower and the arms of the left-side module and the right-side module are coupled to the turfgrass brush in the active position, the turfgrass brush is positioned in front of the turfgrass mower and when the brush attachment system is mounted on the turfgrass mower and the arms of the left-side module and the right-side module are coupled to the turfgrass brush in the inactive position, the turfgrass brush is positioned above the turfgrass mower.

Particular embodiments may comprise one or more of the following features.

The arm support may have a retaining bar pivotally coupled to the main body adjacent the upper stop, wherein the retaining bar is configured to rotate into a retaining position in which the retaining bar intersects with a plane of rotation of the arm and wherein, when the arm is in the inactive position and the retaining bar is rotated to the retaining position, the retaining bar locks the arm in the inactive position until the retaining bar is rotated out of the retaining position. The main body of the arm support may have a ledge configured to support the retaining bar in the retaining position. The position of the lower stop on the main body of the arm support may be adjustable. The main body of the arm support may have a plurality of holes, wherein each hole of the plurality of holes is configured to couple with the lower stop.

Aspects of this document relate to a brush attachment system for a turfgrass mower comprising a first module having a mounting bracket configured to mount onto a first side of the turfgrass mower, the mounting bracket having a recessed cavity sized and shaped to receive a portion of the turfgrass mower, an arm support coupled to the mounting bracket and rotationally fixed with respect to the mounting bracket, the arm support having a main body with an upper stop and a lower stop extending away from the main body, and an arm having a first end pivotally coupled to the arm support and a second end configured to couple with a turfgrass brush, wherein the upper stop and the lower stop are each positioned to limit rotation of the arm with respect to the arm support and wherein the arm is configured to rotate between an active position in which the arm is adjacent the lower stop and an inactive position in which the arm is adjacent the upper stop, wherein the mounting bracket is configured to be rotationally fixed in all directions with respect to the turfgrass mower when the mounting bracket is mounted onto the turfgrass mower, and wherein when the brush attachment system is mounted on the turfgrass mower and the arm is coupled to the turfgrass brush in the active position, the turfgrass brush is positioned in front of the turfgrass mower and when the brush attachment system is mounted on the turfgrass mower and the arm is coupled to the turfgrass brush in the inactive position, the turfgrass brush is positioned above the turfgrass mower.

Particular embodiments may comprise one or more of the following features.

The brush attachment system may further comprise an adaptor extending through a mounting aperture in the mounting bracket and having a lip sized and shaped to prevent the adaptor from passing completely through the mounting aperture, the adaptor configured to secure the mounting bracket in a mounted position where the portion of the turfgrass mower is within the cavity. The arm support may further have a retaining bar pivotally coupled to the main body adjacent the upper stop, wherein the retaining bar is configured to rotate into a retaining position in which the retaining bar intersects with a plane of rotation of the arm and wherein, when the arm is in the inactive position and the retaining bar is rotated to the retaining position, the retaining bar locks the arm in the inactive position until the retaining bar is rotated out of the retaining position. The main body of the arm support may have a ledge configured to support the retaining bar in the retaining position. The position of the lower stop on the main body of the arm support may be adjustable. The main body of the arm support may have a plurality of holes, wherein each hole of the plurality of holes is configured to couple with the lower stop. The brush attachment system may further comprise an elongated member configured to extend through the turfgrass mower to a second side of the turfgrass mower opposite the first side and exert a first force on the brush attachment system toward the turfgrass mower. The brush attachment system may further comprise a second module configured to mount onto a second side of the turfgrass mower opposite the first side and an elongated member configured to extend through the turfgrass mower, attach the first module to the second module, and exert a first force on the first module toward the turfgrass mower and a second force on the second module toward the turfgrass mower.

Aspects of this document relate to a brush attachment system for a turfgrass mower comprising a mounting bracket configured to mount onto the turfgrass mower, an arm support coupled to the mounting bracket and rotationally fixed with respect to the mounting bracket, and an arm having a first end pivotally coupled to the arm support and a second end configured to couple with a turfgrass brush, wherein the arm is configured to rotate between an active position in which the arm extends towards a front of the turfgrass mower and an inactive position in which the arm extends towards a top of the turfgrass mower, wherein the mounting bracket is configured to be rotationally fixed in all directions with respect to the turfgrass mower when the mounting bracket is mounted onto the turfgrass mower.

Particular embodiments may comprise one or more of the following features.

The arm support may have a main body with an upper stop extending away from the main body, wherein the upper stop is positioned to limit upward rotation of the arm with respect to the arm support and wherein when the arm is in the inactive position, the arm is adjacent the upper stop. The arm support may further have a retaining bar pivotally coupled to the main body adjacent the upper stop, wherein the retaining bar is configured to rotate into a retaining position in which the retaining bar intersects with a plane of rotation of the arm and wherein, when the arm is in the inactive position and the retaining bar is rotated to the retaining position, the retaining bar locks the arm in the inactive position until the retaining bar is rotated out of the retaining position. The main body of the arm support may have a ledge configured to support the retaining bar in the retaining position. The arm support may have a main body with a lower stop extending away from the main body, wherein the lower stop is positioned to limit downward rotation of the arm with respect to the arm support and wherein when the arm is in the active position, the arm is adjacent the lower stop. The position of the lower stop on the main body of the arm support may be adjustable. The main body of the arm support may have a plurality of holes, wherein each hole of the plurality of holes is configured to couple with the lower stop. The mounting bracket may have a recessed cavity sized and shaped to receive a portion of the turfgrass mower. The brush attachment system may further comprise an adaptor extending through a mounting aperture in the mounting bracket and having a lip sized and shaped to prevent the adaptor from passing completely through the mounting aperture, the adaptor configured to secure the mounting bracket in a mounted position where the portion of the turfgrass mower is within the cavity.

Aspects of this document relate to a brush attachment system for a turfgrass mower comprising a first module having a mounting bracket configured to mount onto a first side of the turfgrass mower, a mounting bracket configured to mount onto a first side of the turfgrass mower, an arm support coupled to the mounting bracket, an arm having a first end pivotally coupled to the arm support and a second end configured to couple with a turfgrass brush, wherein the arm is configured to rotate between an active position in which the arm extends towards a front of the turfgrass mower and an inactive position in which the arm is lifted away from the front of the turfgrass mower, and an elongated member configured to extend through the turfgrass mower to a second side of the turfgrass mower opposite the first side and exert a first force on the brush attachment system toward the turfgrass mower.

Particular embodiments may comprise one or more of the following features.

The arm support may have a main body with an upper stop extending away from the main body, wherein the upper stop is positioned to limit upward rotation of the arm with respect to the arm support and wherein when the arm is in the inactive position, the arm is adjacent the upper stop. The arm support may further have a retaining bar pivotally coupled to the main body adjacent the upper stop, wherein the retaining bar is configured to rotate into a retaining position in which the retaining bar intersects with a plane of rotation of the arm and wherein, when the arm is in the inactive position and the retaining bar is rotated to the retaining position, the retaining bar locks the arm in the inactive position until the retaining bar is rotated out of the retaining position. The arm support may have a main body with a lower stop extending away from the main body, wherein the lower stop is positioned to limit downward rotation of the arm with respect to the arm support and wherein when the arm is in the active position, the arm is adjacent the lower stop. The position of the lower stop on the main body of the arm support may be adjustable. The mounting bracket may have a recessed cavity sized and shaped to receive a portion of the turfgrass mower. The brush attachment system may further comprise an adaptor extending through a mounting aperture in the mounting bracket and having a lip sized and shaped to prevent the adaptor from passing completely through the mounting aperture, the adaptor configured to secure the mounting bracket in a mounted position where the portion of the turfgrass mower is within the cavity.

The foregoing and other aspects, features, applications, and advantages will be apparent to those of ordinary skill in the art from the specification, drawings, and the claims.

Unless specifically noted, it is intended that the words and phrases in the specification and the claims be given their plain, ordinary, and accustomed meaning to those of ordinary skill in the applicable arts. The inventor is fully aware that they can be their own lexicographers if desired. The inventor expressly elects, as their own lexicographer, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . ." or "step for performing the function of . . . ," if the claims also recite any structure, material or acts in support of that means or step, or that perform the recited function, then it is the clear intention of the inventor not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

BRIEF DESCRIPTION OF THE DRAWINGS

Implementations will hereinafter be described in conjunction with the appended drawings, where like designations denote like elements, and.

Figure 1:
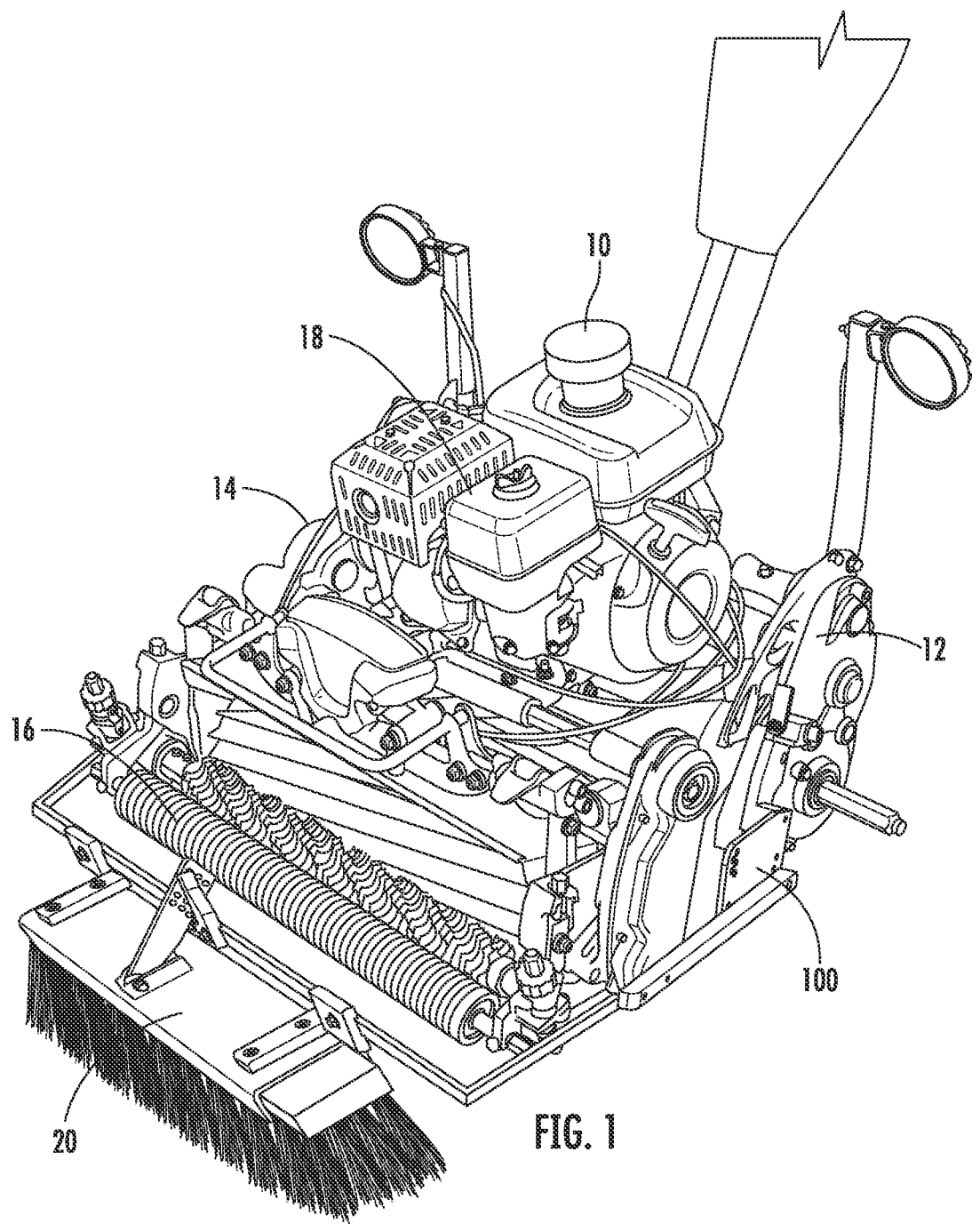
FIG. 1 is a perspective view of the brush attachment system mounted on a turfgrass mower and coupled to a turfgrass brush, with the arms in the active position.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations that are described in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

Figure 2:
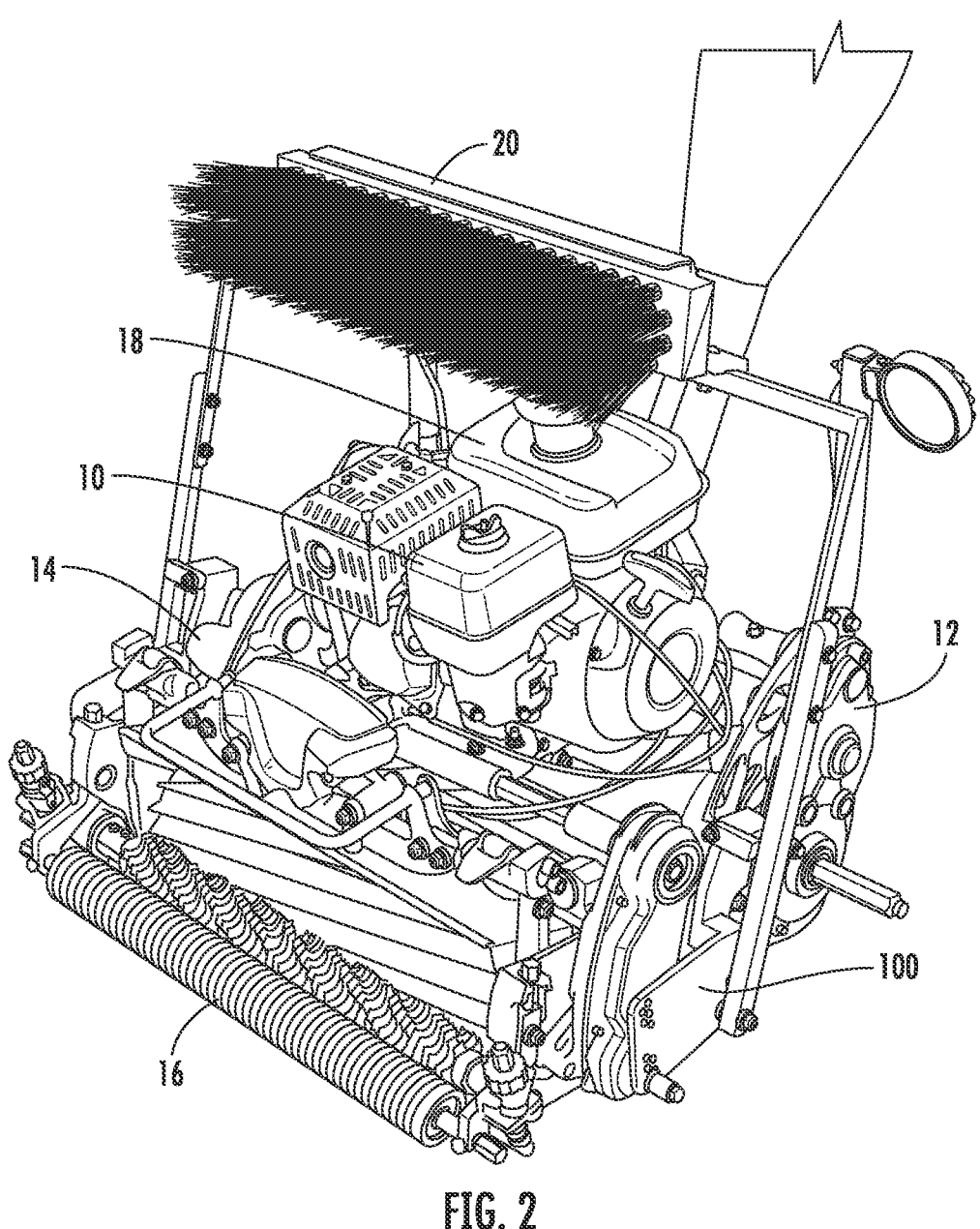
FIG. 2 is another perspective view of the brush attachment system shown in FIG. 1 with the arms in the inactive position.

The present disclosure is related to a brush attachment system 100 for turfgrass mowers 10. The brush attachment system 100 disclosed herein is configured to attach to a turfgrass mower 10 in a way that allows the brush attachment system 100 to brush the grass just before the turfgrass mower 10 cuts the grass. The brush attachment system 100 is configured to allow the brush 20 to follow the vertical contours of the grass as the turfgrass mower 10 travels without allowing the brush 20 to move side-to-side. This improves the ability of the user to cut the grass evenly and in straight lines. As shown in FIGS. 1 and 2, the brush attachment system 100 may be configured to raise and lower a turfgrass brush 20 between an active position (shown in FIG. 1) and an inactive position (shown in FIG. 2). Thus, the user can selectively engage the turfgrass brush 20 as desired.

Figure 3:
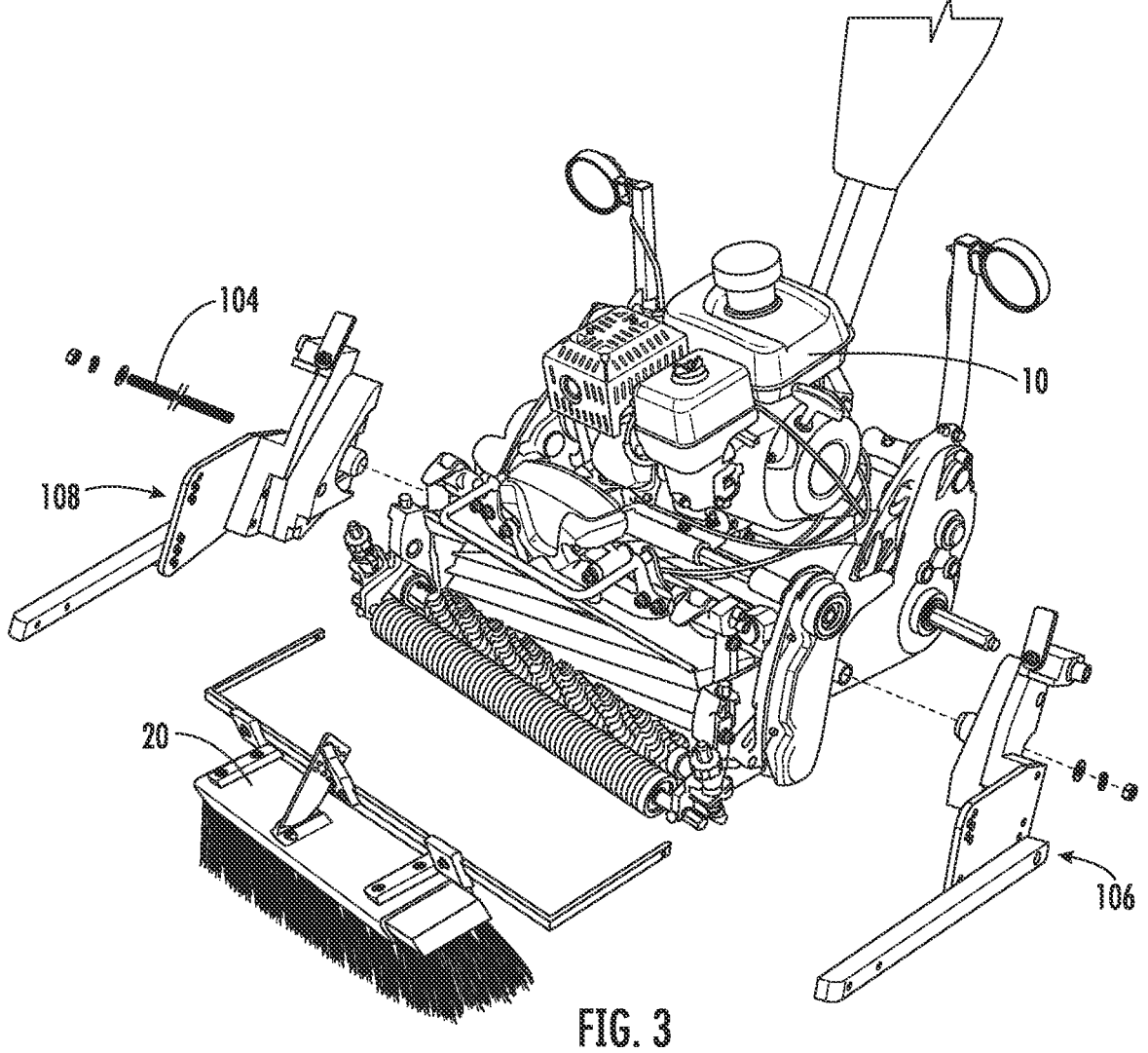
FIG. 3 is an exploded view of the brush attachment system shown in FIG. 1.

As shown in FIG. 3, the brush attachment system 100 may comprise at least one module 102 and an elongated member 104. The at least one module 102 may include only a first module 102, a first module 102 and a second module 102, or a left-side module 106 and a right-side module 108. The left-side module 106 and the right-side module 108 may be mirrored copies of each other. Thus, in this disclosure, while the left-side module 106 and the right-side module 108 may be described as having the same components, it is to be understood that, in some embodiments, these components may be mirrored copies between the left-side module 106 and the right-side module 108.

The at least one module 102 is configured to couple with a first side 12 of the turfgrass mower 10. This allows the module 102 to selectively engage the turfgrass brush 20 as described above. The elongated member 104 is configured to extend through the turfgrass mower 10 to a second side 14 of the turfgrass mower 10 opposite the first side 12. For example, the turfgrass mower 10 may have a hollow bar that extends through the mower 10 through which the elongated member 104 may extend. This allows one end of the elongated member 104 to be coupled with the first side 12 and the other end of the elongated member 104 to be coupled to the second side 14 or to another module 102. In this way, the elongated member 104 can exert a force on the module 102 toward the turfgrass mower 10, thus securing the module 102 to the turfgrass mower 10. The elongated member 104 may be a rod, a cable, or some other elongated object. In some embodiments, the elongated member 104 is threaded on each end to facilitate tightening the modules 102 onto the turfgrass mower 10.

As shown in FIGS. 5-12, each module 102 may comprise a mounting bracket 114, an adaptor 116, an arm support 118, and/or an arm 120. The mounting bracket 114 is configured to mount onto the turfgrass mower 10 and be rotationally fixed in all directions with respect to the turfgrass mower 10. In other words, when the mounting bracket 114 is mounted on the turfgrass mower 10, the mounting bracket 114 does not rotate about an x-, y-, or z-axis, but instead is fixed with respect to the turfgrass mower 10. This provides a solid foundation for the module 102 so that the module 102 can properly support the brush 20 as described above. The mounting bracket 114 may have a mounting aperture 122 and a recessed cavity 124. The mounting aperture 122 allows the elongated member 104 to extend through the mounting bracket 114 so that the elongated member 104 can pull the module 102 toward the turfgrass mower 10, as will be described in more detail below with respect to the adaptor 116. The cavity 124 is sized and shaped to receive a portion of the turfgrass mower 10. This helps the module 102 to mount onto the turfgrass mower 10 and prevent any rotation with respect to the turfgrass mower 10. The portion of the turfgrass mower 10 within the cavity 124 may fill the cavity 124 and leave no extra space within the cavity 124. Alternatively, the portion of the turfgrass mower 10 within the cavity 124 may not fill the cavity 124 but still fix the position of the mounting bracket 114 with respect to the turfgrass mower 10. The cavity 124 may surround the mounting aperture 122 so that the portion of the turfgrass mower 10 within the cavity 124 also has the elongated member 104 extending through it.

The adaptor 116 is configured to extend through the mounting aperture 122 of the mounting bracket 114 and may be configured to secure the mounting bracket 114 in a mounted position where the portion of the turfgrass mower is within the cavity 124. The adaptor 116 may engage with the turfgrass mower 10 to help align the mounting bracket 114 with the turfgrass mower 10. For example, the adaptor 116 may extend through the mounting bracket 114 and insert into a hole or receiver in the turfgrass mower 10 to help guide the mounting bracket 114 onto the turfgrass mower 10. This can provide additional support to the mounting bracket 114 to help rotationally fix the mounting bracket 114 with respect to the turfgrass mower 10. The adaptor 116 may have a circular cross-section, and thus be capable of rotating within the mounting aperture 122. Other cross sections may also be implemented. Additionally, other methods for coupling the elongated member 104 to the module 102, with or without an adaptor, may be implemented. For example, the module 102 may not have an adaptor 116, and instead, the elongated member 104 may attach directly to the mounting bracket 114 or another component of the module 102.

The elongated member 104 may be coupled to the adaptor 116 and the force exerted by the elongated member 104 on the module 102 may be applied through the adaptor 116. In other words, the elongated member 104 may be tightened to pull the adaptor 116 toward the turfgrass mower 10, and the adaptor 116 may be configured to transfer that force to the mounting bracket 114. For example, the adaptor 116 may have a lip 126 that is sized and shaped to prevent the adaptor 116 from passing completely through the mounting aperture 122. The adaptor 116 may also have a hole 128 extending through the adaptor 116 through which the elongated member 104 may extend. The hole 128 may extend along an axis of the adaptor 116, which helps center the elongated member 104 in the mounting aperture 122 and balance the load on the mounting bracket 114. The elongated member 104 thus may extend through the adaptor 116 and then couple with a washer and/or nut, allowing the elongated member 104 to be tightened to apply the force to the module 102 discussed above. In embodiments with a module 102 on either side of the turfgrass mower 10, including those embodiments with a left-side module 106 and a right-side module 108, the elongated member 104 may extend through the adaptors 116 of the right-side module 108 and the left-side module 106 and then be tightened on both sides. This allows the elongated member 104 to apply the force toward the turfgrass mower 10 to both modules 102 simultaneously.

The arm support 118 is coupled or attached to the mounting bracket 114. Depending on the embodiment, the arm support 118 and the mounting bracket 114 may be joined together by any variety of methods as known in the art. For example, the arm support 118 and the mounting bracket 114 may be joined by a plurality of screws, by a weld, or even by being integrally formed together. The arm support 118 is rotationally fixed with respect to the mounting bracket 114. The arm support 118 has a main body 130 and may have an upper stop 132 and/or a lower stop 134 extending away from the body 130, as discussed in more detail below.

Figure 4:
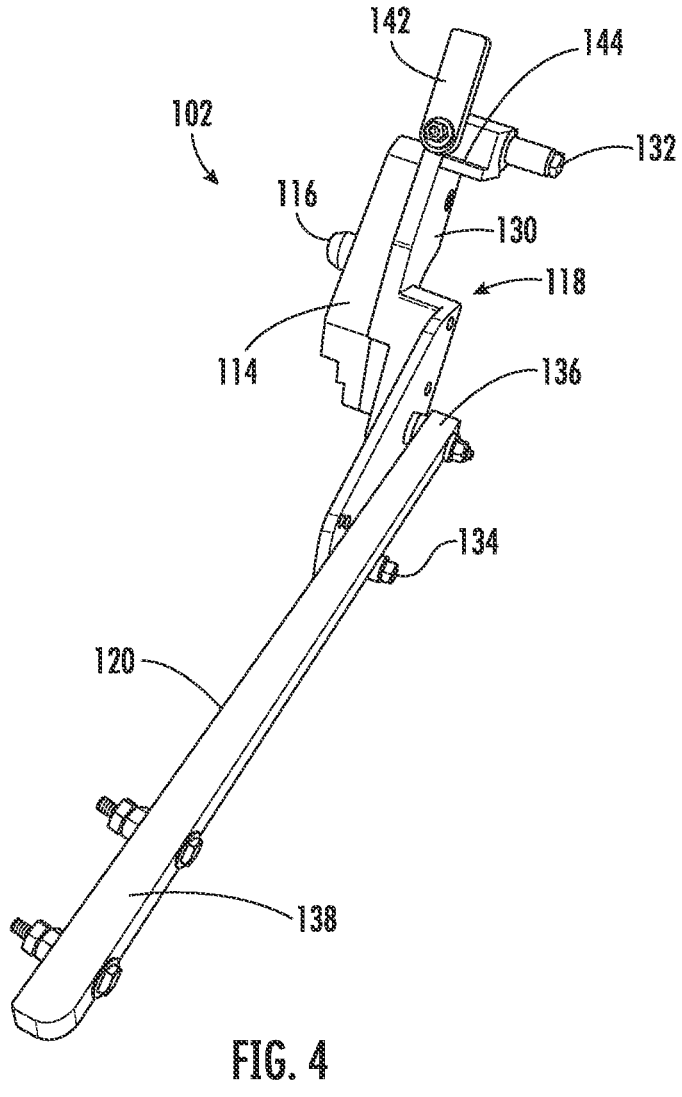
FIG. 4 is a perspective view of one module of the brush attachment system shown in FIG. 1 with the arm in the active position.
Figure 5:
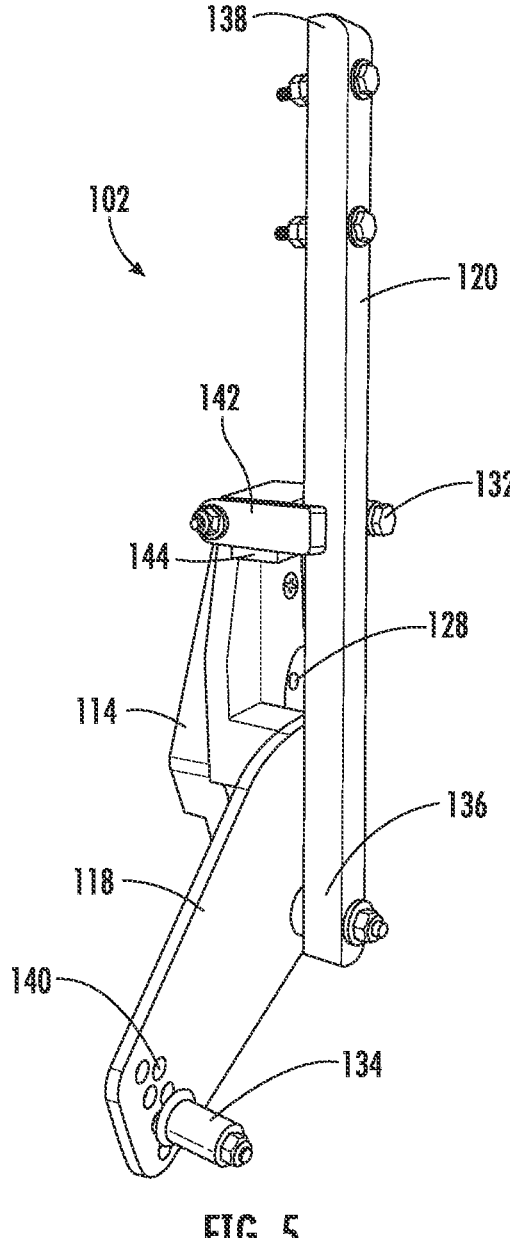
FIG. 5 is a perspective view of the module shown in FIG. 4 with the arm in the inactive position and the retaining bar in the retaining position.
Figure 6:
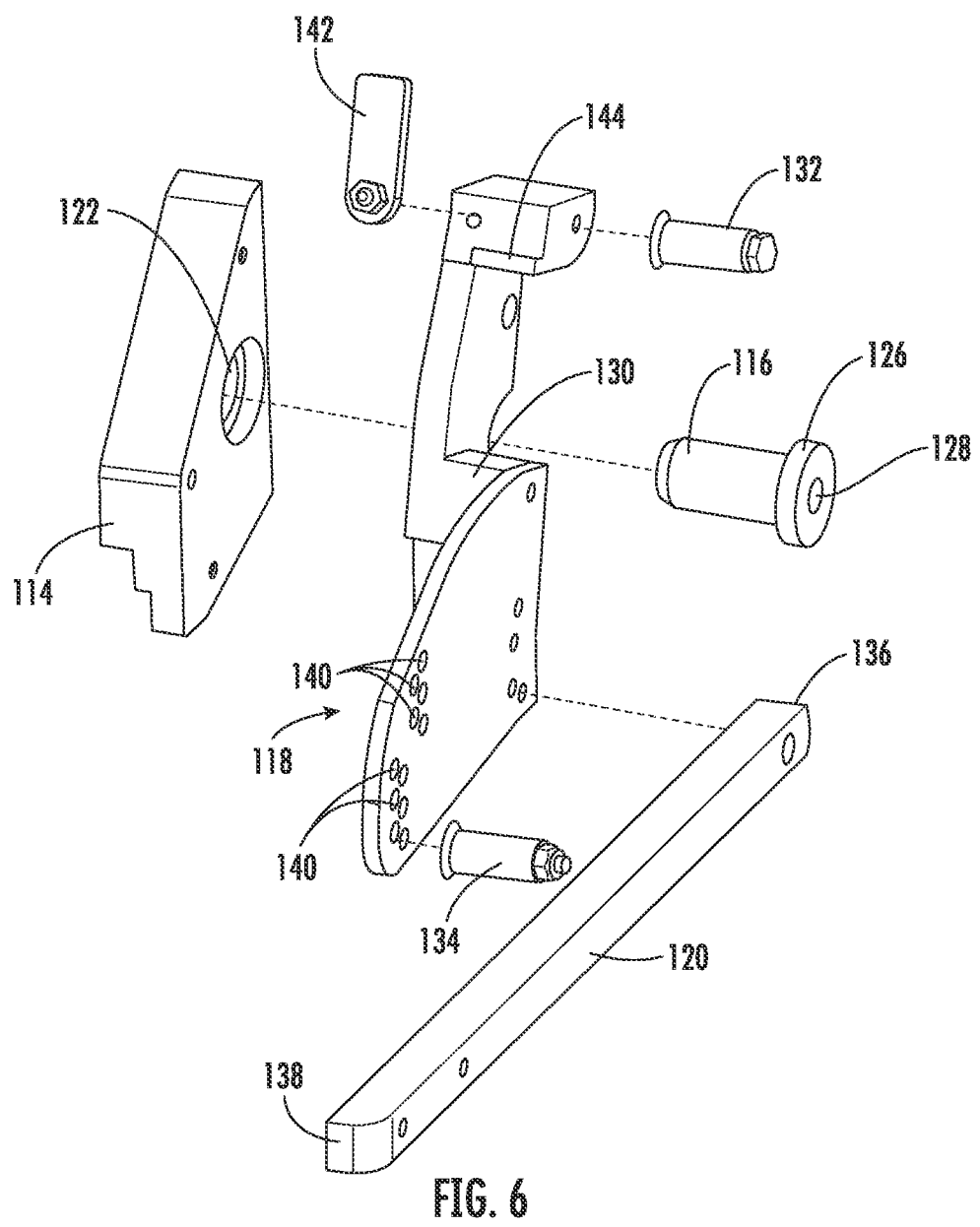
FIG. 6 is an exploded view of the module shown in FIG. 4.
Figure 7:
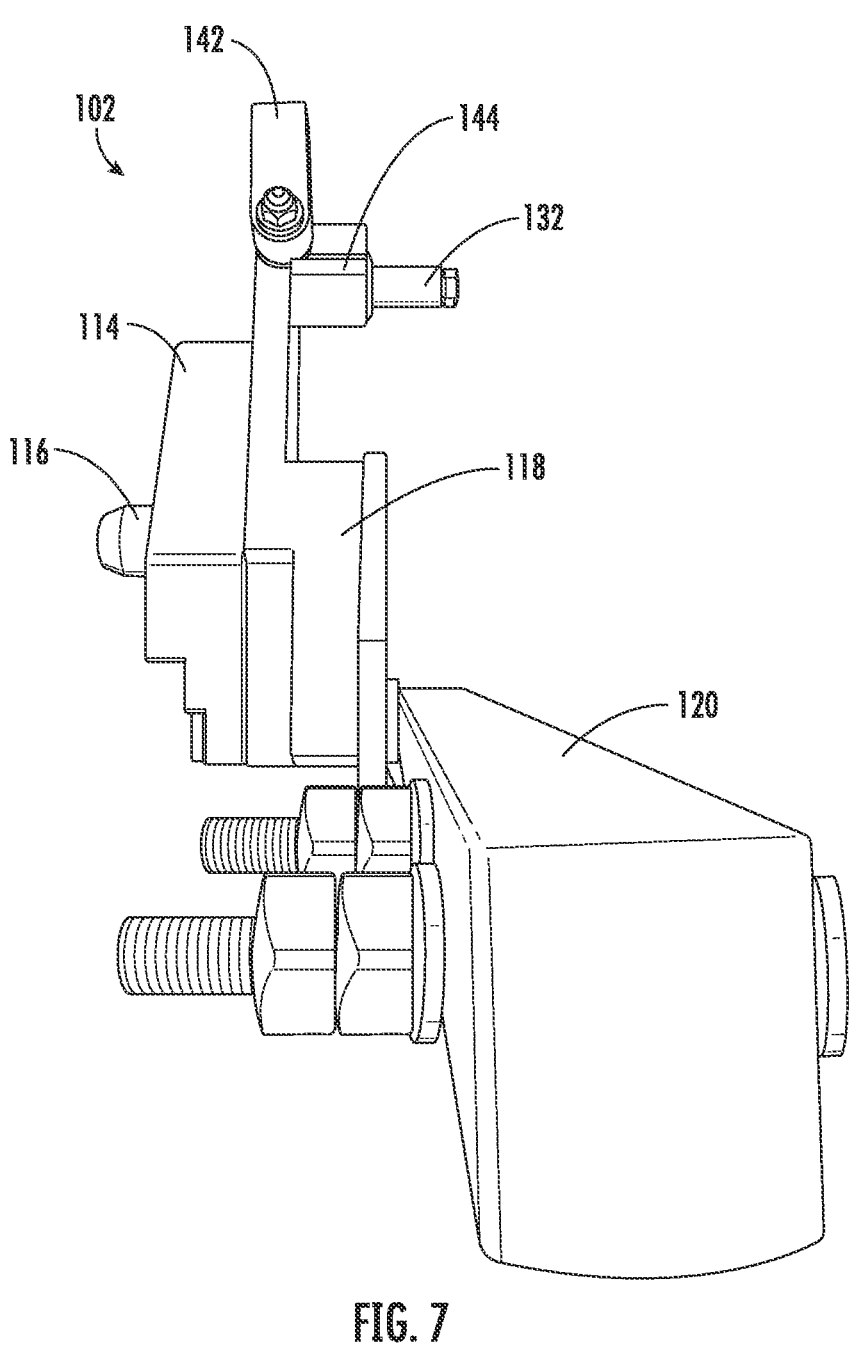
FIG. 7 is front view of the module shown in FIG. 4.
Figure 8:
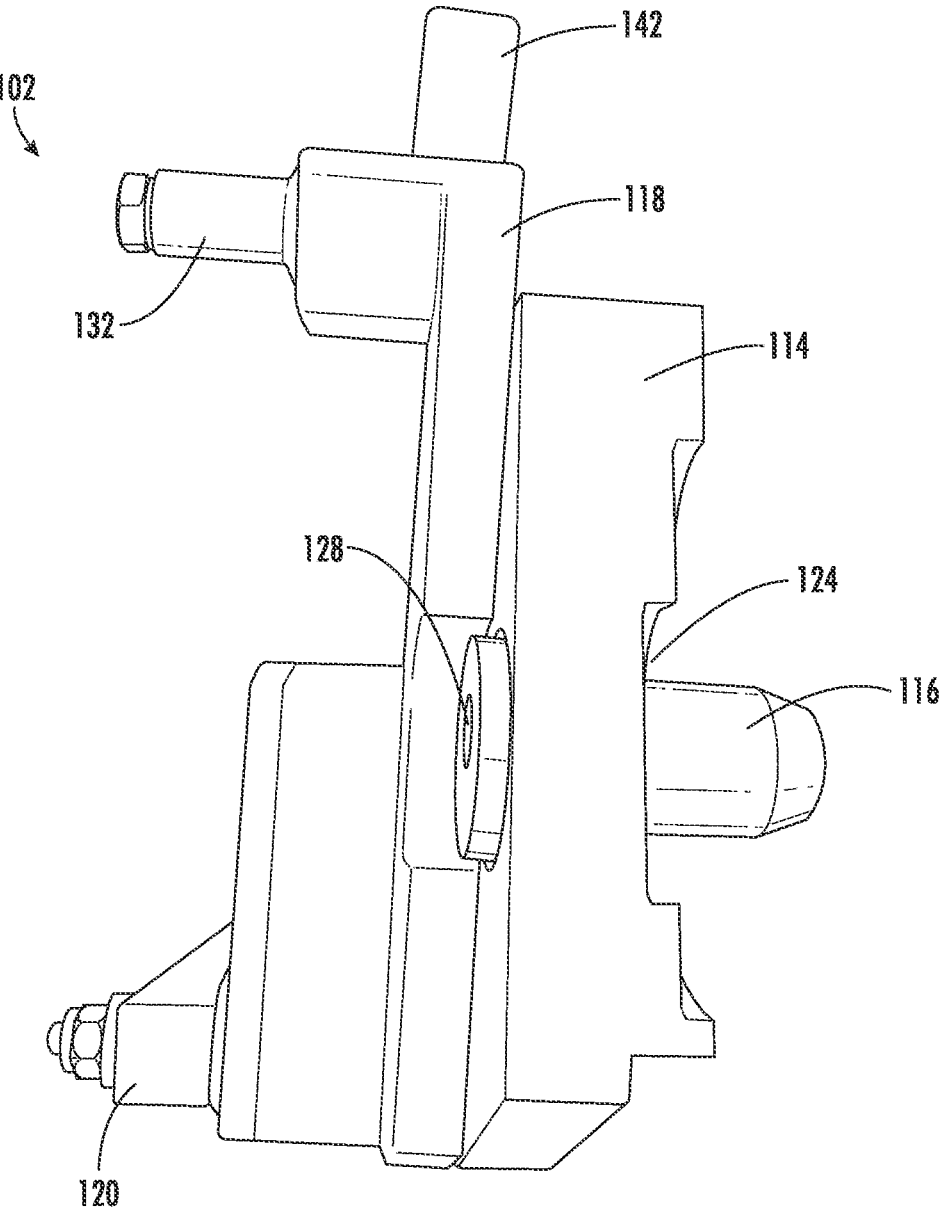
FIG. 8 is a back view of the module shown in FIG. 4.
Figure 9:
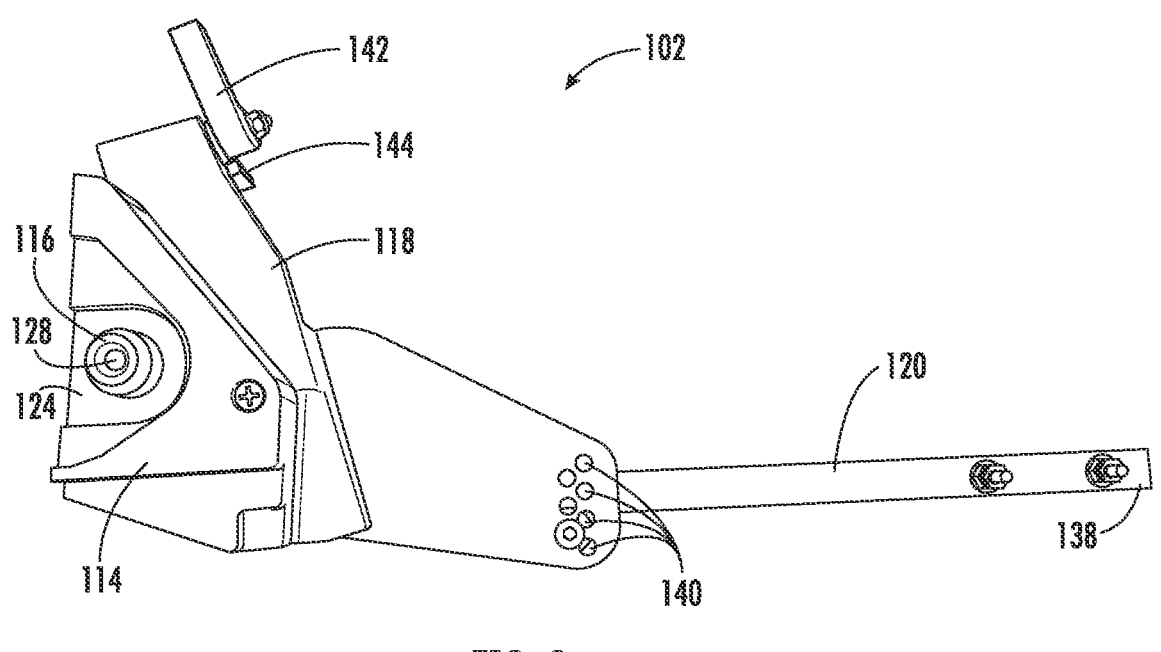
FIG. 9 is a left-side view of the module shown in FIG. 4.
Figure 10:
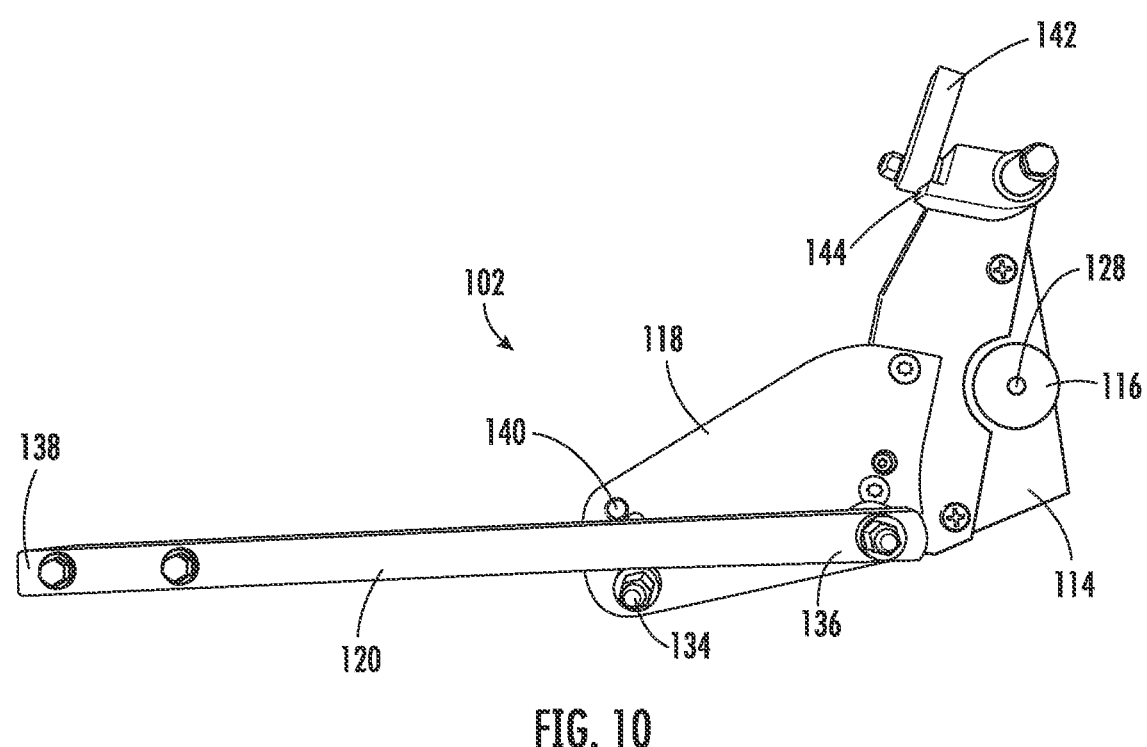
FIG. 10 is a right-side view of the module shown in FIG. 4.
Figure 11:
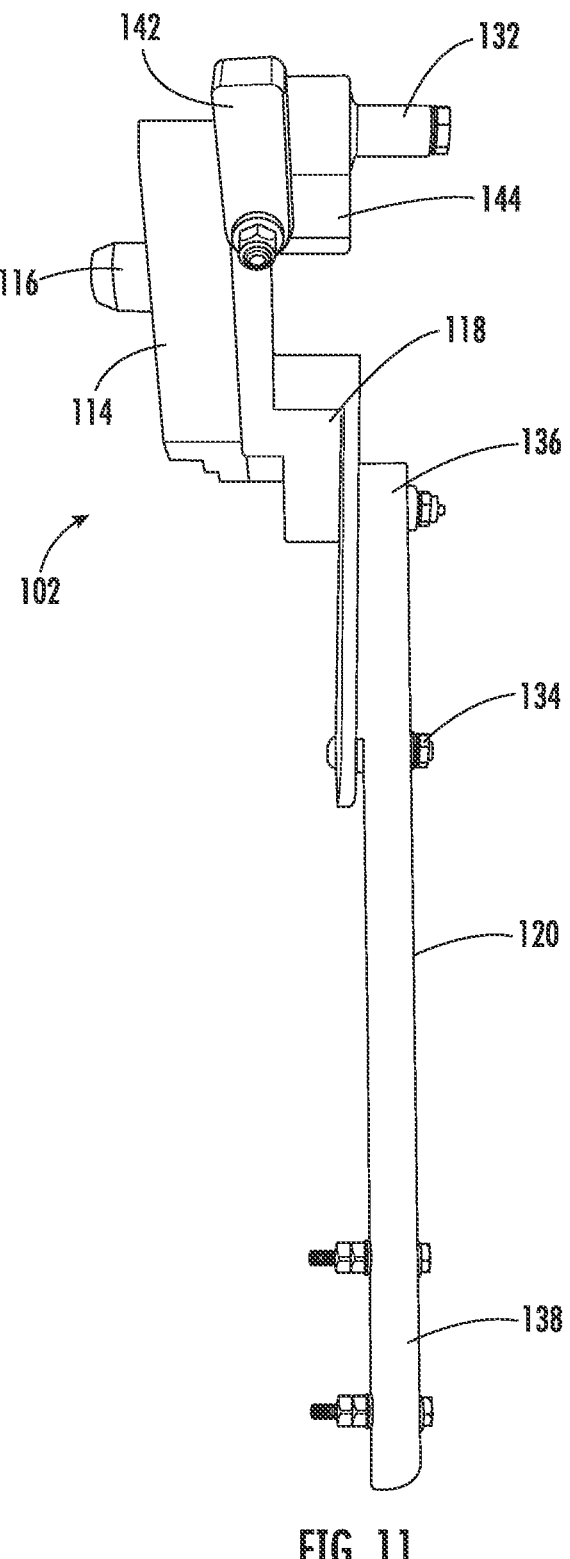
FIG. 11 is a top view of the module shown in FIG. 4.
Figure 12:
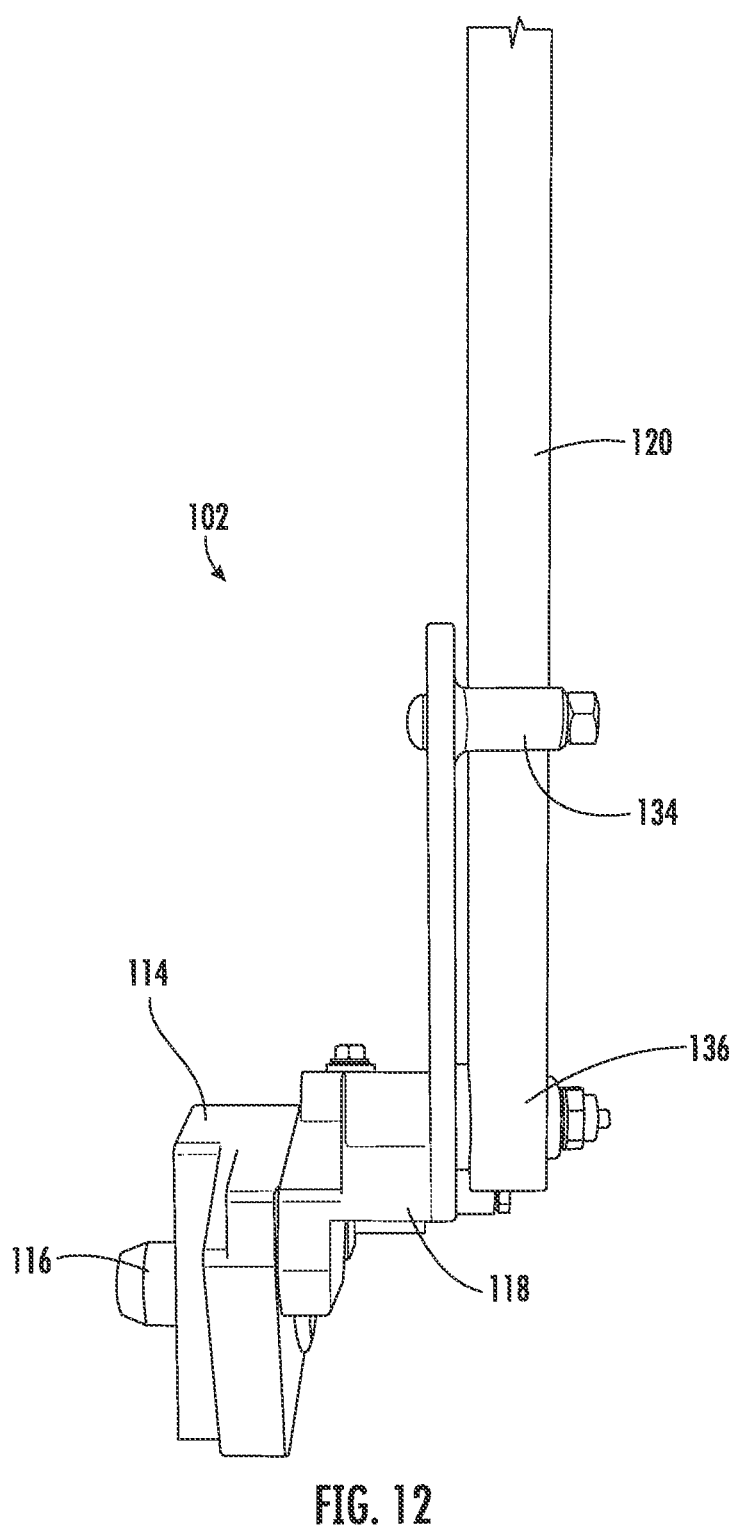
FIG. 12 is a bottom view of the module shown in FIG. 4.

The arm 120 has a first end 136 and a second end 138 opposite the first end 136. The first end 136 of the arm 120 is pivotally coupled to the arm support 118, thus allowing the arm 120 to rotate with respect to the arm support 118, the mounting bracket 114, and the turfgrass mower 10. The second end 138 of the arm 120 is configured to couple with the turfgrass brush 20. In embodiments with a module 102 on each side of the turfgrass mower 10, the arms 120 may each couple with a different end of the turfgrass brush 20 to stabilize the turfgrass brush 20 and provide extra support. The length of the arm 120 is selected to allow the brush 20 to move freely above and in front of the turfgrass mower 10 between the active position (see FIGS. 1 and 4) and the inactive position (see FIGS. 2 and 5) as the arm 120 rotates about the arm support 118. When the arm 120 is in the active position, the arm 120 extends from the first end 136 of the arm 120 towards a front 16 of the turfgrass mower 10 and when the arm 120 is in the inactive position, the arm 120 is lifted away from the front 16 of the turfgrass mower 10, and may extend from the first end 136 of the arm 120 towards a top 18 of the turfgrass mower, as shown. When the turfgrass mower 10 is in use cutting grass and the arm 120 is in the active position, the brush 20 is positioned in front of the turfgrass mower 10 and in contact with the grass, brushing through the grass just before the turfgrass mower 10 cuts the grass. When the arm 120 is in the inactive position, the brush 20 is lifted up above the turfgrass mower.

The upper stop 132 and the lower stop 134 are positioned in the plane of rotation of the arm 120, and thus are positioned to limit rotation of the arm 120 with respect to the arm support 118. The upper stop 132 is configured to stop the arm 120 from rotating upward past the upper stop 132 and the lower stop 134 is configured to stop the arm 120 from rotating downward past the lower stop 134. Thus, in embodiments with the upper stop 132 and the lower stop 134, when the arm 120 is in the active position, the arm 120 is adjacent the lower stop 134 and when the arm 120 is in the inactive position, the arm 120 is adjacent the upper stop 132. Thus, the upper stop 132 and the lower stop 134 define the upper and lower limit, respectively, of the rotation of the arm 120. The lower stop 134 additionally serves to allow the turfgrass mower 10 to be lifted up without the brush 20 swinging underneath the turfgrass mower 10. The position of the lower stop 134 on the body 130 of the arm support 118 may be adjustable to accommodate different brush sizes for the brush 20 and different desired ranges of motion for the arm 120. The body 130 may have a plurality of holes 140 and the lower stop 134 is configured to couple with any of these holes 140, thus making the position of the lower stop 134 adjustable.

The arm support 118 may also have a retaining bar 142 that is pivotally coupled to the main body 130. The retaining bar 142 may be adjacent the upper stop 134. The retaining bar 142 is configured to selectively lock the arm 120 in the inactive position so that the user can move the arm 120 into the inactive position and prevent the brush 20 from falling in front of the turfgrass mower 10 until desired. The retaining bar 142 is therefore configured to rotate into a retaining position in which the retaining bar 142 intersects with the plane of rotation of the arm 120. When the arm 120 is in the inactive position and the retaining bar 142 is rotated into the retaining position, the retaining bar 142 locks the arm 120 in the inactive position until the retaining bar 142 is rotated out of the retaining position. The body 130 of the arm support 118 may have a ledge 144 that is positioned adjacent the retaining bar 140 and is configured to support the retaining bar 142 when the retaining bar 142 is in the retaining position. This prevents gravity from moving the retaining bar 142 out of the retaining position.

It will be understood that implementations of a brush attachment system are not limited to the specific assemblies, devices and components disclosed in this document, as virtually any assemblies, devices and components consistent with the intended operation of a brush attachment system may be used. Accordingly, for example, although particular brush attachment systems, and other assemblies, devices and components are disclosed, such may include any shape, size, style, type, model, version, class, measurement, concentration, material, weight, quantity, and/or the like consistent with the intended operation of brush attachment systems. Implementations are not limited to uses of any specific assemblies, devices and components; provided that the assemblies, devices and components selected are consistent with the intended operation of a brush attachment system.

Accordingly, the components defining any brush attachment system may be formed of any of many different types of materials or combinations thereof that can readily be formed into shaped objects provided that the materials selected are consistent with the intended operation of a brush attachment system. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various brush attachment systems may be manufactured using conventional procedures as added to and improved upon through the procedures described here. Some components defining a brush attachment system may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling brush attachment systems are not limited to the specific order of steps as disclosed in this document. Any steps or sequence of steps of the assembly of a brush attachment system indicated herein are given as examples of possible steps or sequence of steps and not as limitations, since various assembly processes and sequences of steps may be used to assemble brush attachment systems.

The implementations of a brush attachment system described are by way of example or explanation and not by way of limitation. Rather, any description relating to the foregoing is for the exemplary purposes of this disclosure, and implementations may also be used with similar results for a variety of other applications employing a brush attachment system.

What is claimed is:

1. A brush attachment system for a turfgrass mower, comprising:
    a left-side module and a right-side module configured to respectively couple with a left side and a right side of the turfgrass mower, each of the left-side module and the right-side module having:
        a mounting bracket configured to mount onto the turfgrass mower, the mounting bracket having a mounting aperture surrounded by a recessed cavity sized and shaped to receive a portion of the turfgrass mower;
        an adaptor extending through the mounting aperture of the mounting bracket and having a lip sized and shaped to prevent the adaptor from passing completely through the mounting aperture, the adaptor configured to secure the mounting bracket in a mounted position where the portion of the turfgrass mower is within the cavity;
        an arm support coupled to the mounting bracket and rotationally fixed with respect to the mounting bracket, the arm support having a main body with an upper stop and a lower stop extending away from the main body; and
        an arm having a first end pivotally coupled to the arm support and a second end configured to couple with a turfgrass brush, wherein the upper stop and the lower stop are each positioned to limit rotation of the arm with respect to the arm support and wherein the arm is configured to rotate between an active position in which the arm is adjacent the lower stop and an inactive position in which the arm is adjacent the upper stop; and
        an elongated member configured to extend through the turfgrass mower, attach the adaptor of the left-side module to the adaptor of the right-side module, and exert a first force on the adaptor of the left-side module toward the turfgrass mower and a second force on the adaptor of the right-side module toward the turfgrass mower;
    wherein the mounting bracket is configured to be rotationally fixed in all directions with respect to the turfgrass mower when the mounting bracket is mounted onto the turfgrass mower; and
    wherein when the brush attachment system is mounted on the turfgrass mower and the arms of the left-side module and the right-side module are coupled to the turfgrass brush in the active position, the turfgrass brush is positioned in front of the turfgrass mower and when the brush attachment system is mounted on the turfgrass mower and the arms of the left-side module and the right-side module are coupled to the turfgrass brush in the inactive position, the turfgrass brush is positioned above the turfgrass mower.

2. The brush attachment system of claim 1, the arm support further having a retaining bar pivotally coupled to the main body adjacent the upper stop, wherein the retaining bar is configured to rotate into a retaining position in which the retaining bar intersects with a plane of rotation of the arm and wherein, when the arm is in the inactive position and the retaining bar is rotated to the retaining position, the retaining bar locks the arm in the inactive position until the retaining bar is rotated out of the retaining position.

3. The brush attachment system of claim 2, the main body of the arm support having a ledge configured to support the retaining bar in the retaining position.

4. The brush attachment system of claim 1, wherein the position of the lower stop on the main body of the arm support is adjustable.

5. The brush attachment system of claim 4, the main body of the arm support having a plurality of holes, wherein each hole of the plurality of holes is configured to couple with the lower stop.

6. A brush attachment system for a turfgrass mower comprising a first module having:
    a mounting bracket configured to mount onto a first side of the turfgrass mower, the mounting bracket having a recessed cavity sized and shaped to receive a portion of the turfgrass mower;
    an arm support coupled to the mounting bracket and rotationally fixed with respect to the mounting bracket, the arm support having a main body with an upper stop and a lower stop extending away from the main body, wherein the lower stop has a position that is adjustable;
    a plurality of holes perforating at least a portion of the main body of the arm support, wherein each hole of the plurality of holes is configured to couple with the lower stop; and
    an arm having a first end pivotally coupled to the arm support and a second end configured to couple with a turfgrass brush, wherein the upper stop and the lower stop are each positioned to limit rotation of the arm with respect to the arm support and wherein the arm is configured to rotate between an active position in which the arm is adjacent the lower stop and an inactive position in which the arm is adjacent the upper stop;
    wherein the mounting bracket is configured to be rotationally fixed in all directions with respect to the turfgrass mower when the mounting bracket is mounted onto the turfgrass mower; and
    wherein when the brush attachment system is mounted on the turfgrass mower and the arm is coupled to the turfgrass brush in the active position, the turfgrass brush is positioned in front of the turfgrass mower and when the brush attachment system is mounted on the turfgrass mower and the arm is coupled to the turfgrass brush in the inactive position, the turfgrass brush is positioned above the turfgrass mower.

7. The brush attachment system of claim 6, further comprising an adaptor extending through a mounting aperture in the mounting bracket and having a lip sized and shaped to prevent the adaptor from passing completely through the mounting aperture, the adaptor configured to secure the mounting bracket in a mounted position where the portion of the turfgrass mower is within the cavity.

8. The brush attachment system of claim 6, the arm support further having a retaining bar pivotally coupled to the main body adjacent the upper stop, wherein the retaining bar is configured to rotate into a retaining position in which the retaining bar intersects with a plane of rotation of the arm and wherein, when the arm is in the inactive position and the retaining bar is rotated to the retaining position, the retaining bar locks the arm in the inactive position until the retaining bar is rotated out of the retaining position.

9. The brush attachment system of claim 8, the main body of the arm support having a ledge configured to support the retaining bar in the retaining position.

10. The brush attachment system of claim 6, further comprising an elongated member configured to extend through the turfgrass mower to a second side of the turfgrass mower opposite the first side and exert a first force on the brush attachment system toward the turfgrass mower.

11. The brush attachment system of claim 6, further comprising a second module configured to mount onto a second side of the turfgrass mower opposite the first side and an elongated member configured to extend through the turfgrass mower, attach the first module to the second module, and exert a first force on the first module toward the turfgrass mower and a second force on the second module toward the turfgrass mower.

12. A brush attachment system for a turfgrass mower comprising:
   a mounting bracket configured to mount onto the turfgrass mower;
   an arm support rotationally fixed to the mounting bracket, having:
      a main body with an upper stop extending away from the main body, wherein the upper stop is positioned to limit upward rotation of the arm with respect to the arm support and wherein when the arm is in the inactive position, the arm is adjacent the upper stop; and
      a retaining bar pivotally coupled to the main body adjacent the upper stop, wherein the retaining bar is configured to rotate into a retaining position in which the retaining bar intersects with a plane of rotation of the arm and wherein, when the arm is in the inactive position and the retaining bar is rotated to the retaining position, the retaining bar locks the arm in the inactive position until the retaining bar is rotated out of the retaining position; and
   an arm having a first end pivotally coupled to the arm support and a second end configured to couple with a turfgrass brush, wherein the arm is configured to rotate between an active position in which the arm extends towards a front of the turfgrass mower and an inactive position in which the arm extends towards a top of the turfgrass mower;
   wherein the mounting bracket is configured to be rotationally fixed in all directions with respect to the turfgrass mower when the mounting bracket is mounted onto the turfgrass mower.

13. The brush attachment system of claim 12, the main body of the arm support having a ledge configured to support the retaining bar in the retaining position.

14. The brush attachment system of claim 12, the arm support having a main body with a lower stop extending away from the main body, wherein the lower stop is positioned to limit downward rotation of the arm with respect to the arm support and wherein when the arm is in the active position, the arm is adjacent the lower stop.

15. The brush attachment system of claim 14, wherein the position of the lower stop on the main body of the arm support is adjustable.

16. The brush attachment system of claim 15, the main body of the arm support having a plurality of holes, wherein each hole of the plurality of holes is configured to couple with the lower stop.

17. The brush attachment system of claim 12, wherein the mounting bracket has a recessed cavity sized and shaped to receive a portion of the turfgrass mower.

18. The brush attachment system of claim 17, further comprising an adaptor extending through a mounting aperture in the mounting bracket and having a lip sized and shaped to prevent the adaptor from passing completely through the mounting aperture, the adaptor configured to secure the mounting bracket in a mounted position where the portion of the turfgrass mower is within the cavity.

19. A brush attachment system for a turfgrass mower comprising a first module having:
   a mounting bracket configured to mount onto a first side of the turfgrass mower, wherein the mounting bracket has a recessed cavity sized and shaped to receive a portion of the turfgrass mower;
   an adaptor extending through a mounting aperture in the mounting bracket and having a lip sized and shaped to prevent the adaptor from passing completely through the mounting aperture, the adaptor configured to secure the mounting bracket in a mounted position where the portion of the turfgrass mower is within the cavity;
   an arm support coupled to the mounting bracket;
   an arm having a first end pivotally coupled to the arm support and a second end configured to couple with a turfgrass brush, wherein the arm is configured to rotate between an active position in which the arm extends towards a front of the turfgrass mower and an inactive position in which the arm is lifted away from the front of the turfgrass mower; and
   an elongated member configured to extend through the turfgrass mower to a second side of the turfgrass mower opposite the first side and exert a first force on the brush attachment system toward the turfgrass mower.

20. The brush attachment system of claim 19, the arm support having a main body with an upper stop extending away from the main body, wherein the upper stop is positioned to limit upward rotation of the arm with respect to the arm support and wherein when the arm is in the inactive position, the arm is adjacent the upper stop.

21. The brush attachment system of claim 20, the arm support further having a retaining bar pivotally coupled to the main body adjacent the upper stop, wherein the retaining bar is configured to rotate into a retaining position in which the retaining bar intersects with a plane of rotation of the arm and wherein, when the arm is in the inactive position and the retaining bar is rotated to the retaining position, the retaining bar locks the arm in the inactive position until the retaining bar is rotated out of the retaining position.

22. The brush attachment system of claim 19, the arm support having a main body with a lower stop extending away from the main body, wherein the lower stop is positioned to limit downward rotation of the arm with respect to the arm support and wherein when the arm is in the active position, the arm is adjacent the lower stop.

23. The brush attachment system of claim 22, wherein the position of the lower stop on the main body of the arm support is adjustable.

* * * * *